UNITED STATES PATENT OFFICE.

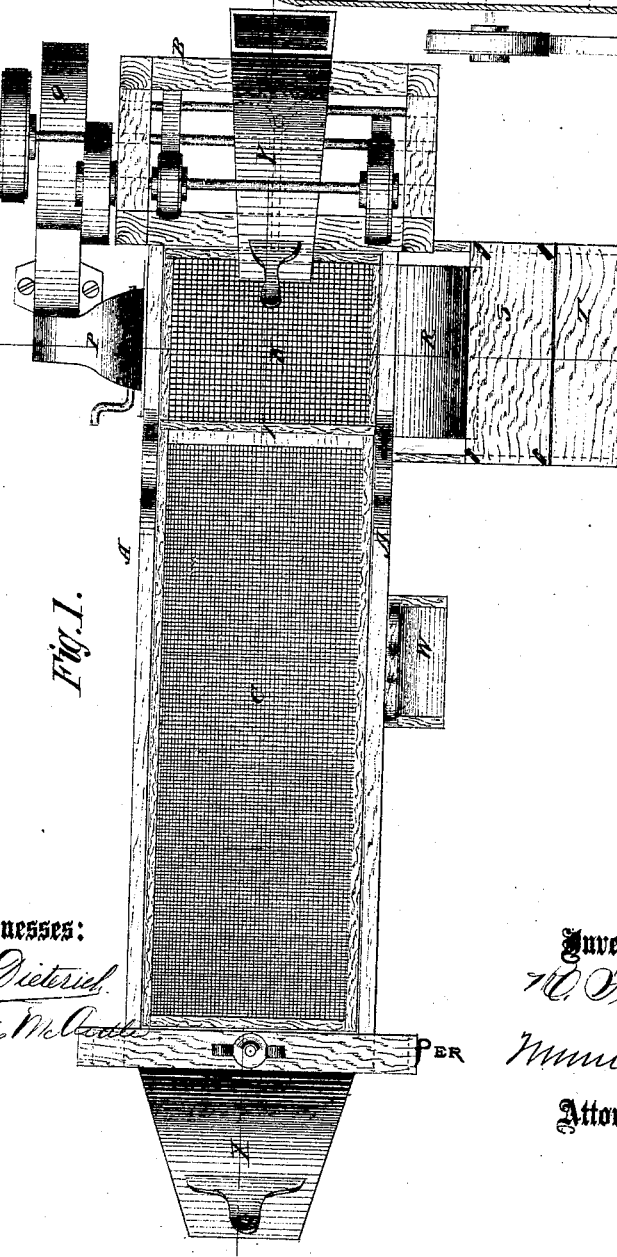

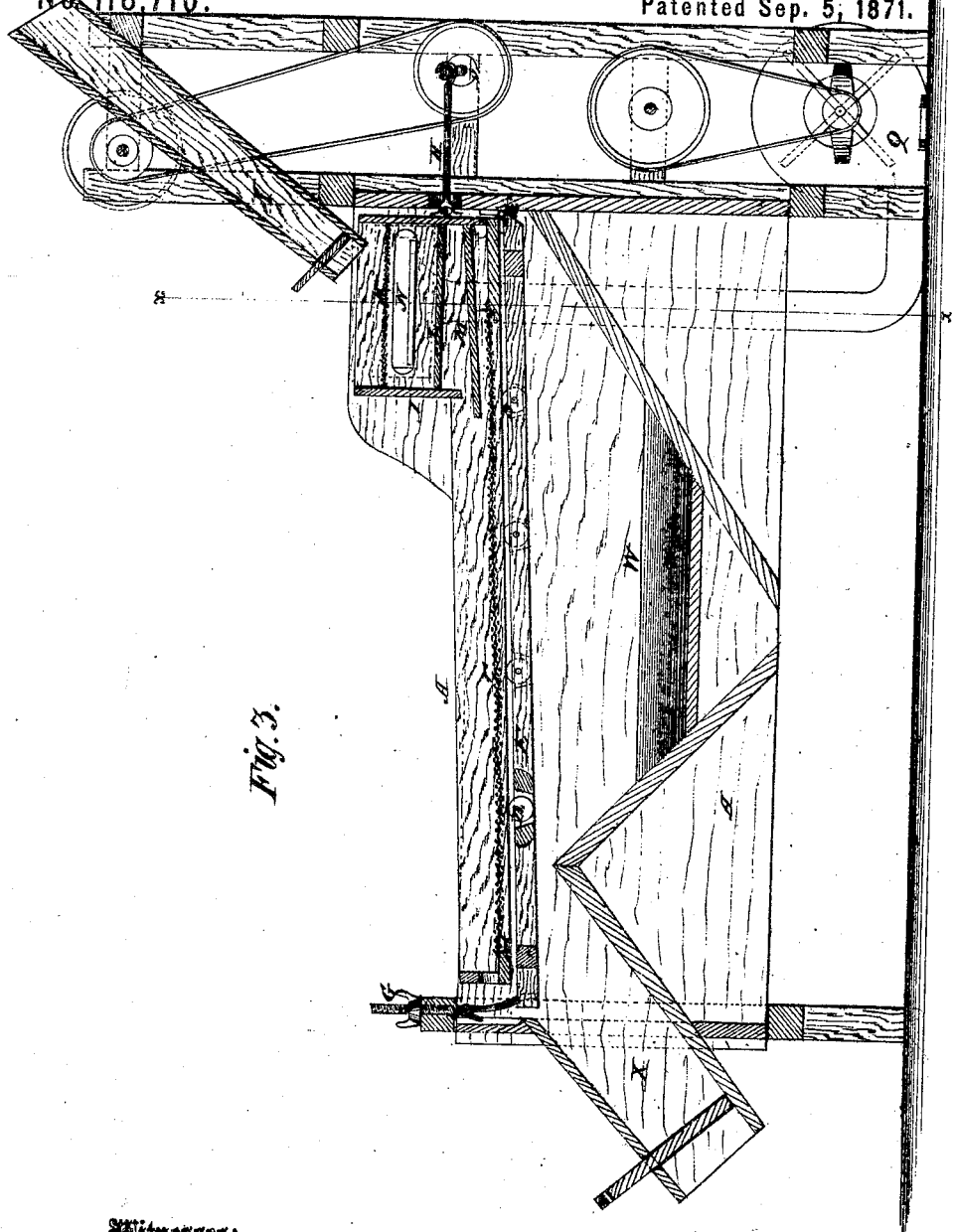

RICHARD FRISBY, OF CLEVELAND, OHIO.

IMPROVEMENT IN COFFEE AND GRAIN-CLEANERS AND SEPARATORS.

Specification forming part of Letters Patent No. 118,710, dated September 5, 1871.

*To all whom it may concern:*

Be it known that I, RICHARD FRISBY, of Cleveland, in the county of Cuyahoga and State of Ohio, have invented a new and Improved Coffee and Grain-Cleaner and Separator; and I do hereby declare that the following is a full, clear, and exact description thereof, which will enable others skilled in the art to make and use the same, reference being had to the accompanying drawing forming part of this specification.

My invention consists in the improvement of coffee and grain-cleaners, as hereinafter fully described and subsequently pointed out in the claim.

Figure 1 is a plan view of the improved machine. Fig. 2 is a transverse section taken on the line $x\ x$ of Fig. 1, and Fig. 3 is a longitudinal section taken on the line $y\ y$ of Fig. 2.

Similar letters of reference indicate corresponding parts.

A is a long rectangular case supported on any suitable framing and provided at one end with a framing, B, for the support of the fan-blowing and screen-driving gear. C is a long screen arranged in the upper part of this frame, on rollers D of a frame, E, hinged to the case at one end, F, and suspended at the other by an adjusting-screw, G, somewhat lower than the end which is hinged. The screen is connected by a rod, H, to a crank-shaft, I, by which it is shaken. At the end of the screen which is highest it is provided with a small case, I, open at the top, and having a screen, K, near the top $a$, an apron, L, below said screen descending from one side toward the other, and another, M, descending from the upper end toward the lower end of screen C. It also has an opening, N, in one side coinciding with an opening, O, in case A, and another in the opposite side corresponding with one in case A.

An air-conducting pipe, P, leading from a fan, Q, discharges through openings O and N into case I, and a spout, R, leads from said case at the opposite side into chamber S, which has a horizontal discharge, T, and a vertical one, U, with a vertical screen, V, traversing said discharge. Below the screen (except a small portion at the lower end) is a hopper, W, for receiving the smaller grains passing through it, and at the lower end is a spout, X, for receiving the larger grains passing through the lower part and over the tail. Y is a spout, by which the coffee or grain is discharged into the machine.

This machine is intended to be used in connection with a hulling or scouring-mill to dust and separate the grain, or by itself for separating different grades of coffee and cleaning it of all foreign matter, which is intended to be blown out through spout R and discharge T, while any grains blown through spout R will be arrested by screen V and fall through spout U into a receptacle below. The screen R separates all coarse matters, which may be removed by hand.

A valve, Z, is arranged in the mouth of conductor P for regulating the draught. By having the air blown across the screens I am enabled to employ a much longer screen, C, than can be when blown lengthwise of it.

Having thus described my invention, I claim as new and desire to secure by Letters Patent—

The combination and arrangement of the screens C K, aprons L M, spout R S T U, screw N, and the fan-blower, substantially as specified.

RICHARD FRISBY.

Witnesses:
ALEX. B. HALLIWELL,
WILLIAM CLARK.